(No Model.)
B. S. SLINN.
FETTER FOR COWS' TAILS.
No. 334,906. Patented Jan. 26, 1886.
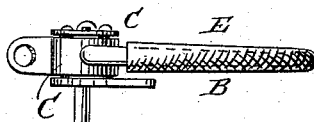
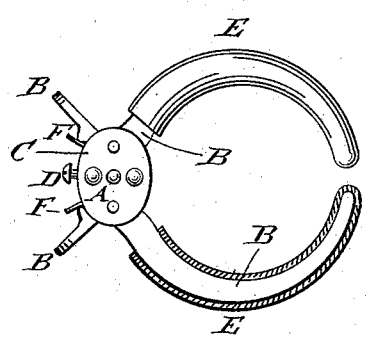
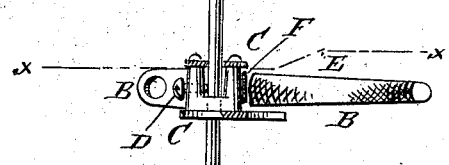
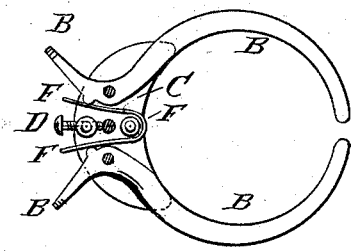
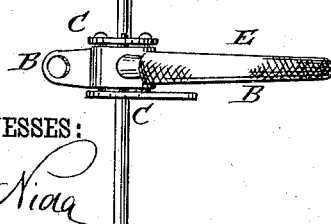
WITNESSES:
INVENTOR:
B. S. Slinn
BY Munn & Co.
ATTORNEYS.

UNITED STATES PATENT OFFICE.

BENJAMIN S. SLINN, OF SPRING VALLEY, NEW YORK.

FETTER FOR COWS' TAILS.

SPECIFICATION forming part of Letters Patent No. 334,906, dated January 26, 1886.

Application filed February 9, 1885. Serial No. 155,321. (No model.)

*To all whom it may concern:*

Be it known that I, BENJAMIN S. SLINN, of Spring Valley, in the county of Rockland and State of New York, have invented a new and useful Improvement in Fetters for Cows' Tails, of which the following is a full, clear, and exact description.

Reference is to be had to the accompanying drawings, forming a part of this specification, in which similar letters of reference indicate corresponding parts in all the figures.

Figure 1 is a side elevation of my improvement, partly in section. Fig. 2 is a plan view of the same, partly in section. Fig. 3 is a sectional plan view of the same, taken through the line $x\,x$, Fig. 1, and showing the jaws without the rubber tubes.

The object of this invention is to provide an improved attachment for cows' tails, the use of which will prevent the cows from switching their tails into the faces of the persons milking them.

The invention relates to an anti-switching attachment for cows' tails, constructed with a rod provided with spring-clamps, whereby the attachment can be readily applied to and detached from a cow's tail, and will prevent the cow from switching her tail in the milker's face, as will be hereinafter fully described, and pointed out in the claims.

A represents a rod, and B are pairs of clamps, two or more of which are used, and which are connected with rod A. The clasps B of each pair are pivoted or otherwise attached to a hub, C, through which the rod A passes, and which is secured in place adjustably upon the said rod A by a set-screw, D, passing in through the said hub C, so that its forward end will rest against the side of the said rod A; or the said rod and clamps can be connected by other suitable means.

The clamps B are curved outward, forward, and inward, so that their forward ends will nearly meet, the curvature being such that the said clamps will grasp a cow's tail. The clamps B have rubber tubes E placed upon them to prevent them from injuring the cow's tail.

The clamps B are pressed inward or toward each other by springs F, or by their own elasticity, with sufficient force to cause them to grasp the cow's tail so firmly that the implement will be securely supported. The springs F may be U-shaped springs, as shown in Fig. 3, or V-shaped springs, or spiral springs, or other suitable springs, as may be desired.

The rear ends of the clamps B project a little in the rear of their pivots, to serve as handles for convenience in opening the said clamps B in applying the attachment to and removing it from a cow's tail.

In applying the attachment the clamps B are opened and passed over the cow's tail, and then allowed to close and grasp the said tail, the upper pair of clamps B being placed near the root of the tail.

This attachment, when applied to a cow's tail, prevents the tail from being bent, and consequently prevents the cow from switching her tail into the face of a milker, and thus saves the milker from a very great annoyance.

Having thus described my invention, I claim as new and desire to secure by Letters Patent—

1. An anti-switching attachment for cows' tails, consisting of a rod and spring-clamps having apertured hubs to receive the rod and adjustably secured on the said rod, substantially as herein shown and described.

2. In an anti-switching attachment for cows' tails, the combination, with the rod A, of hubs C, having set-screws D, two or more pairs of clamps, B, pivoted to the said hubs, and springs F, substantially as herein shown and described, whereby the attachment can be readily applied to and detached from a cow's tail, and will prevent the cow from switching her tail, as set forth.

BENJAMIN S. SLINN.

Witnesses:
JAMES T. GRAHAM,
C. SEDGWICK.